US008423056B2

(12) United States Patent
Abrantes et al.

(10) Patent No.: US 8,423,056 B2
(45) Date of Patent: Apr. 16, 2013

(54) SENDING TIME-SENSITIVE INFORMATION VIA A SHORT MESSAGE SERVICE

(75) Inventors: Audrey Jill R. Abrantes, Calamba (PH); Cesar O. Adawag, Taguig (PH); Vivencio O. Bernardio, Laguna (PH); Gene Kenneth F. Javier, Las Pinas (PH); Edgardo G. Patajo, Mandaluyong (PH)

(73) Assignee: HGST Netherlands B.V., Amsterdam (NL)

( * ) Notice: Subject to any disclaimer, the term of this patent is extended or adjusted under 35 U.S.C. 154(b) by 1029 days.

(21) Appl. No.: 11/894,330

(22) Filed: Aug. 20, 2007

(65) Prior Publication Data

US 2009/0054088 A1 Feb. 26, 2009

(51) Int. Cl.
*H04W 4/00* (2009.01)
(52) U.S. Cl.
USPC .......... 455/466; 455/404.1; 455/412.2; 455/414.1; 455/418
(58) Field of Classification Search .......... 709/206–207; 455/404.1–404.2, 466, 414.1, 412.2, 418; 379/88.16
See application file for complete search history.

(56) References Cited

U.S. PATENT DOCUMENTS

| 6,941,345 B1 | 9/2005 | Kapil et al. | |
| 2005/0197096 A1* | 9/2005 | Yang et al. | 455/404.1 |
| 2006/0001539 A1* | 1/2006 | Adamczyk et al. | 340/539.18 |
| 2006/0146997 A1* | 7/2006 | Qian et al. | 379/88.16 |
| 2008/0194224 A1* | 8/2008 | Thorson et al. | 455/404.1 |
| 2009/0023418 A1* | 1/2009 | Grevers, Jr. | 455/404.1 |

FOREIGN PATENT DOCUMENTS

| WO | WO-2004/084444 | 9/2004 |
| WO | WO-2004/084532 | 9/2004 |
| WO | WO-2005/001789 | 1/2005 |

OTHER PUBLICATIONS

American Emergency Notification, "Emergency Notification Without Equal", *Copyright 2006 American Emergency Notification a division of GenuTec Business Solutions, Inc.*, (2006),1-3.
Promptxt, "Broadcast Text Messaging", *Promptxt*, (Feb. 14, 2007),1.
SMS Text Messaging, "SMS Worldwide", mhtml:file://C:\Notes\PKTMP001.mht, (Feb. 14, 2007),1-4.
Broad System, "Emergency Information Lines", www.broadsystem.com, (2006),1-3.
Haas, Juergen "Linux Powers Text Message Broadcast System", *About: Focus on Linux*, http://linux.about.com/b/a/151590.htm?rd=1, Mar. 6, 2005, 1.
Chatter Inc., "Clients", mhtml:file://C:\Notes\PKTMP001.mht!http://www.2chatter.com/clients.htm, 2003-2007, (2003),1-2.
SXS Xprez, "Application", mhtml:file://C:\Notes\PKTMP000.mht, *Ontrack Systems Limited*, 2006-2007., (2006),1-9.
Citrus Lounge, "SMS "Text Messaging"Broadcasting", *Citrus Lounge Limited*, 2004., (2004),1.

(Continued)

*Primary Examiner* — Kathy Wang-Hurst

(57) ABSTRACT

A method for informing at least one person of time-sensitive information via a short message service is disclosed. The technology initially accesses a data base of contact information related to at least one person in response to receiving a request to deliver the time-sensitive information via a short message service. The time-sensitive information is then assigned to at least one person. The time-sensitive information is then sent to at least one person. Then feedback is received as to at least one person's receipt of the time-sensitive information.

17 Claims, 5 Drawing Sheets

OTHER PUBLICATIONS

TXT Signal, "Broadcast Text Messaging to Employees, customers, vendors", *2003-2006 Seventh Compass, Inc.*, (2003),1-5.

Zone Map, "Preston City Centre Evacuation".

* cited by examiner

300

```
Start
  ↓
Access a data base of contact information related to at least
one person in response to receiving a request to deliver the
time-sensitive information via a short message service.
305
  ↓
Assign time-sensitive information to at least one person.
310
  ↓
Send time-sensitive information to at least one person.
315
  ↓
Receive feedback that time-sensitive information was
received by at least one person.
320
  ↓
End
```

FIG. 3

SENDING TIME-SENSITIVE INFORMATION VIA A SHORT MESSAGE SERVICE

TECHNICAL FIELD

The field of the present technology relates to information dissemination. More particularly, embodiments of the present technology relate to disseminating information using a short message service.

BACKGROUND ART

Presently, televisions and radios are used to disseminate information. For example, the disseminated information may forecast or raise awareness as to severe weather conditions, health emergencies, traffic congestion caused by accidents, destruction of a bridge, a fire, etc. Additionally, based upon an occurring or forecasted event, plans and appointments may be cancelled and buildings may be closed. For example, in response to a typhoon forecasted to hit a certain coastal area, all buildings within fifteen miles of the coastal area are closed. Television and radios may alert people as to the impending typhoon and the resulting building closures.

Televisions and radios may disseminate information regarding other types of closures, such as schools, work, roadways, etc. Ultimately, these announcements alert people to the need to do such things as purchase survival tools at the hardware store, stock up on food, board up the windows of a house, etc.

However, there are a number of problems with respect to the current method of disseminating information associated with occurring or forecasted events. For example, a person may not have watched or listened to the local television broadcast regarding a forecasted torrential rain-storm, and therefore is unaware of any impending danger. The person may then drive to work to find the building closed. As a result of remaining unaware as to the impending rain-storm, the person wasted time in driving to and from work, and was endangered in the process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for informing at least one person of time-sensitive information via a short message service is disclosed. The technology initially accesses a data base of contact information related to at least one person in response to receiving a request to deliver the time-sensitive information via a short message service. The time-sensitive information is then assigned to at least one person. The time-sensitive information is then sent to at least one person. Then feedback is received as to at least one person's receipt of the time-sensitive information.

DESCRIPTION OF THE DRAWINGS

The accompanying drawings, which are incorporated in and form a part of this specification, illustrate embodiments of the technology for informing at least one person of time-sensitive information and, together with the description, serve to explain the principles discussed below:

FIG. 3 is a flowchart of an example method for informing at least one person of a time-sensitive message via a short message service shown in accordance with embodiments of the present technology.

Figure 1:
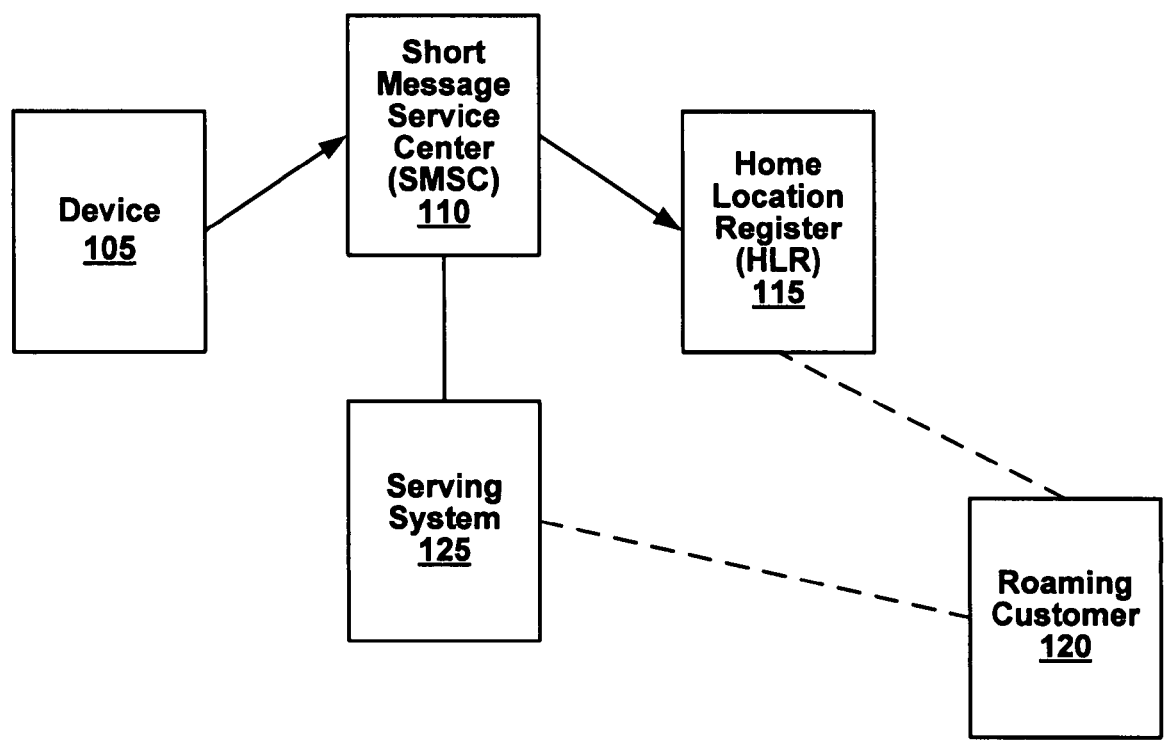
FIG. 1 is a diagram of an example time sensitive information informer shown in accordance with one embodiment of the present technology.

The drawings referred to in this description should be understood as not being drawn to scale except if specifically noted.

DETAILED DESCRIPTION

Reference will now be made in detail to embodiments of the present technology. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, it will be recognized by one of ordinary skill in the art that the present technology may be practiced without these specific details. In other instances, well known methods, procedures, components, and have not been described in detail as not to unnecessarily obscure aspects of the present embodiments. Unless specifically stated otherwise as apparent from the following discussions, it is appreciated that throughout the present detailed description, discussions utilizing terms such as "accessing", "assigning", "sending", "receiving", "selecting", "utilizing", "providing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and mechanical computers.

The discussion will begin with an overview of a short message service. The discussion will then focus on embodiments of the invention that provide a time-sensitive information informer for informing at least one person of time-sensitive information via a short message service. The discussion will then focus on the method for informing at least one person of time-sensitive information via a short message service.

Overview

The present technology uses a program which is capable of accessing a network in order to send time-sensitive information via a short message service. In general, a short message service (SMS) is a service enabling the transmission of short text-only messages to and from a mobile phone, a fax machine and/or an IP address. Each message has a maximum number of allowable alpha-numeric characters. With reference now to 100 of FIG. 1, a block diagram of the components of an example SMS is shown. In one embodiment, SMS 100 comprises device 105, Short Message Service Center (SMSC) 110, Home Location Register (HLR) 115, roaming customer 120, and serving system 125. Device 105 and roaming customer 120 may be a mobile phone, a fax machine, and/or an IP address.

In the operation of one embodiment, a message is sent from mobile phone 105 to SMSC 110, with the request that the message be delivered to a certain roaming customer 120. SMSC 110 sends a SMS request to HLR 115, asking HLR 115 to locate roaming customer 120. In turn, HLR 115 locates roaming customer 120. Once roaming customer 120 is located, HLR 115 sends SMSC 110 a SMS notification to this effect. SMSC 110 then transfers the message to serving system 125, which pages roaming customer 120. When roaming customer 120 responds to the page, the message is delivered. SMSC 110 receives verification that roaming customer 120 received the message.

The present technology overlays this SMS system onto a program which is capable of accessing a network (such as, but not limited to, a local area network, and/or the Web), in order to send time-sensitive information to one or more persons within a select group of people. The present technology is capable of rapid dissemination of time-sensitive information such as, but not limited to the following: emergencies, traffic conditions, special events, announcements, safety tips, and health advisories.

Initially, the present technology receives time-sensitive information from device 105, such as but not limited to, a mobile phone, a fax machine, and/or one containing an IP address. Then, a data base of contact information is accessed in order to select at least one person to whom time-sensitive information is to be sent. The time-sensitive information is assigned to at least one person. This time-sensitive information is then sent to roaming customer 120 via a short message service, as described herein. Finally, the present technology receives feedback as to the receipt of the time-sensitive information by roaming customer 120.

Structure

Figure 2:
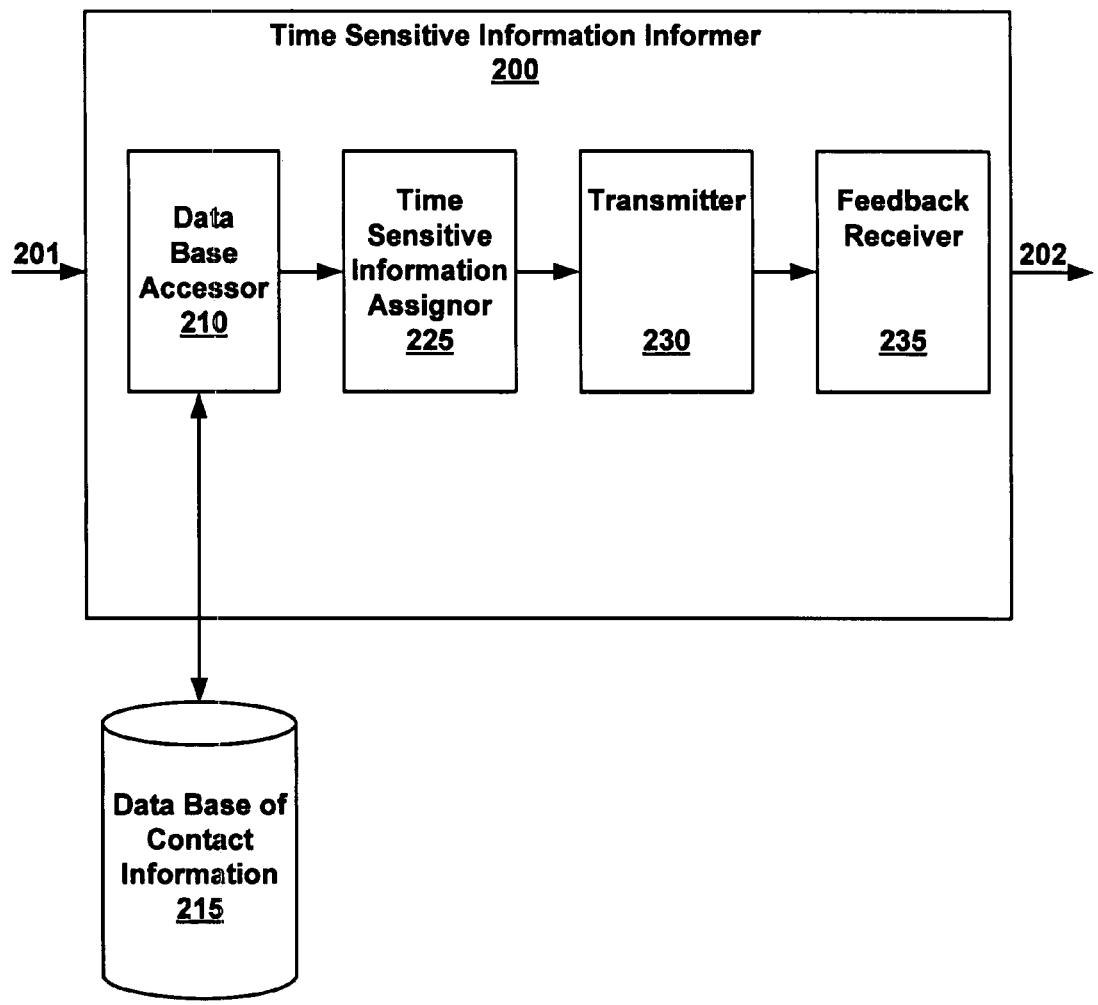
FIG. 2 is a flowchart of an example method for informing at least one person of time-sensitive information via a short message service shown in accordance with embodiments of the present technology.

With reference now to 200 of FIG. 2, a block diagram of one embodiment of a time-sensitive information informer is shown. Time-sensitive information informer (TSII) 200 has data base of people accessor 210, time-sensitive information assignor 225, transmitter 230, and feedback receiver 235, all communicatively coupled to each other. As will be described in detail herein, the elements in combination will enable a method for rapidly and effectively informing at least one person of time-sensitive information via a short message service.

In one embodiment, TSII 200 receives a request 201 from a device 105 to deliver time-sensitive information via SMS 100. Time-sensitive information is that information which is important based upon an involved factor of time. For example, time-sensitive information may be associated with company business, such as a company's holiday party scheduled for a certain time. A report of traffic conditions at a certain time and place is another example of time-sensitive information. Additionally, time-sensitive information may be associated with an emergency, such as a contagious disease currently affecting co-workers.

Data base accessor 210 is configured to access a data base of contact information 215 related to at least one person. Data base of contact information 215 may be a list of people comprising a certain group. For example, data base of contact information 215 may include every employee at a particular company. In contrast, data base of contact information 215 may be a subset within the set comprising every employee of that particular company. For example, this subset may be that which is every employee on the fourth floor.

Data base of contact information 215 includes any amount of gathered information about each person within data base of contact information 215. For instance, data base of contact information 215 may contain a variety of information about a particular person, such as but not limited to the following: phone numbers, addresses, personal identification codes, work schedule, age, medical history, family members, and work history.

For example, after TSII 200 receives a request to deliver time-sensitive information, time-sensitive information accessor 225 assigns at least one person out of data base of contact information 215 to whom the time-sensitive information will be sent. Time-sensitive information accessor 225 may assign all employees on the fourth floor of a company to receive time-sensitive information regarding a fourth floor fire which has recently occurred. The information to be received, for instance, may be the following, "Fire wiped out fourth floor. Do NOT come to work today!".

In one instance, the one person or more persons to whom time-sensitive information is to be delivered may be a related group of people. In another instance, the related group of people to whom time-sensitive information is to be delivered is selected from an aggregation of people consisting of: co-workers, workers on the same floor, workers within a specified building, workers on the same campus, workers working at the same time, workers working in the same location, group leaders, friends, relatives, and neighbors.

In one embodiment, time-sensitive information assignor 225 is configured to receive time-sensitive information and assign said time-sensitive information to said at least one person. For example, time-sensitive information assignor 225 receives the time-sensitive information, "Fire wiped out fourth floor. Do NOT come to work today!", time-sensitive information assignor 225 then assigns all workers on the fourth floor of the building to receive this time-sensitive information. This assignation has the effect of preparing the information to be transmitted to the intended recipient. Additionally, the same time-sensitive information may be assigned to more than one individual and/or group. While in one embodiment, different time-sensitive information may be assigned to just one individual and/or group, in another embodiment, different time-sensitive information may be assigned to more than one individual and/or group.

In one embodiment, transmitter 230 is configured to utilize the contact information to transmit the time-sensitive information to at least one person. This information may be transmitted via wire or wirelessly.

In yet another embodiment, feedback receiver 235 is configured to receive feedback as to whether or not at least one person received the time-sensitive information. For instance, if the sent information, "Fire wiped out fourth floor. Do NOT come to work today!", is received by the assigned recipient (an individual who works on the fourth floor), then feedback receiver 235 receives verification indication 202 that the information has indeed been delivered. Verification indication 202 may be in the form or text, sound, graphics, and/or a signal.

In one embodiment of the present technology, a summarizer is configured to provide a summary of the time-sensitive information sent to provide a summary of the time-sensitive information transmitted to a plurality of communications devices and received by a plurality of communications devices. Furthermore, in conjunction with or separate from providing a summary of the sent time-sensitive information, a summarizer may also provide a summary of the time-sensitive information received by a plurality of communications devices. The summary provided may be in any form which is understandable and desired by the user. For example, the summary may be in the form of a list, and/or in the form of a spreadsheet. Furthermore, the summary may be an abbreviated version of the summary information available.

In one embodiment, TSII 200 is partially and/or fully embedded within a computer program capable of accessing a network. In another embodiment, TSII 200 module is partially and/or fully embedded within a short message service. In yet another embodiment, TSII 200 module stands alone and is configured to be communicatively coupled to a computer program capable of accessing a network and/or a short message service.

Operation

The following discussion sets forth in detail the operation of the present technology through a description of example embodiments. With reference now to FIG. 3, a flowchart 300 of an example computer implemented method for informing at least one person of a time-sensitive message via a short message service is shown in accordance with one embodiment of the present technology.

Referring now to 305 of FIG. 3, and FIGS. 1-2, according to one embodiment, data base of contact information 215 related to at least one person is accessed in response to receiving a request to deliver the time-sensitive information via a short message service. For example, TSII 200 receives a request from device 105 to deliver certain time-sensitive information such as "A typhoon is expected. Stay home today!". After receiving this request, data base of contact information 215 is accessed in order to find a delivery target. The delivery target may be pre-determined, and/or the delivery target may be chosen by a user of the present technology. For example, TSII 200 may be pre-programmed to send time-sensitive information to a specific group of people. Alternatively, TSII 200 is configured to enable a user to select a delivery target.

For example, a user (such as an administrator) may wish that only employees who are working from 1:00 p.m. through 5:00 p.m. be informed of a typhoon. This set of employees who work from 1:00 p.m. until 5:00 p.m. are just a subset of a set of employees working for a company and are included within data base of contact information 215. In an example of a pre-programmed delivery target, TSII 200 may be programmed to send out messages to only the employees who are working the afternoon shift whenever severe weather conditions are forecasted.

Referring now to 310 of FIG. 3, and FIGS. 1-2, according to one embodiment, at least one person is assigned time-sensitive information. For example, a user selects the set of employees who are scheduled to work on the day of the expected rain-storm to receive the message, "A rain-storm is expected. Drive carefully!". In this manner, at least one person is selected from data base of contact information 215 to receive rain-storm information. Additionally, in another example, a user of TSII 200 selects a set of employees who are scheduled to work on the day after the expected rain-storm to receive the same message. In expanding upon the rain-storm example, the employees scheduled to work the day of the intended ice-storm, and the employees scheduled to work the day after the intended rain-storm, are assigned to the intended time-sensitive information.

Referring now to 315 of FIG. 3, and to FIGS. 1-2, according to one embodiment, time-sensitive information is sent to at least one person. For example, both the employees scheduled to work the day of and the day after the intended rain-storm, are sent the message described herein concerning the rain-storm.

Referring now to 320 of FIG. 3, and to FIGS. 1-2, according to one embodiment, feedback is received as to whether the at least one person (intended delivery target) received the time-sensitive information. For example, it is helpful to know which employees did and did not receive the rain-storm message. In one embodiment, an indication is sent, via phone, fax, and/or email, that roaming customer 120 has indeed received the time-sensitive information sought to be delivered.

In one example of the present technology, assigning from a database of contact information 215 at least one person to receive time-sensitive information comprises selecting a group of people. In one instance, this group of people may be selected in such a way so as to appear completely unrelated to each other. In another instance, the group of people is selected from a group of related people consisting of: co-workers, workers on the same floor, workers within a specified building, workers on the same campus, workers working at the same time, and/or workers working in the same location. Furthermore, a group may consist of friends, relatives, or neighbors who work at the same company.

In another embodiment of the present technology, the time-sensitive information which is sent to at least one person further comprises providing the time-sensitive information at a pre-determined time. For instance, the present technology may be programmed to send out weather alert information at 5:00 a.m. to every employee who is scheduled to attend work that day.

Additionally, the present technology may provide time-sensitive information in real time. For instance, when traffic conditions cause a back-up on the freeway, information regarding these traffic conditions are instantaneously sent to the devices assigned to receive this information. The traffic condition information is then instantaneously updated with the changing traffic conditions.

In yet another embodiment of the present technology, if the delivery targets did not receive the time-sensitive information, then a message is sent to a pre-determined location associated with at least one person with instructions to deliver certain time-sensitive information to the delivery target. For example, feedback is received as to whether or not the assigned person or persons to receive the time-sensitive information did indeed receive the information. If the feedback indicates that at least one person did not receive the assigned time-sensitive information, then a message is sent to a third party to deliver the time-sensitive information to the delivery target or targets.

In another embodiment, if the feedback indicates that at least one person (intended target) did not receive the assigned time-sensitive message, then an instruction is sent to a pre-determined location associated with at least one third party, wherein the instruction directs the delivery of the time-sensitive message to the intended target. The third party may be anyone other than the delivery target of the assigned time-sensitive message.

In one embodiment, a summary is provided of the time-sensitive information which was sent to at least one person. For example, if the same time-sensitive information was sent to 125 people, then the summary would list all 125 people to whom the time-sensitive information was sent. It is appreciated that a summary of time-sensitive information sent may consist of a variation of information, depending upon the type of information desired. For example, a user might want to know the list of people whose last names begin with the letter 'G' and were sent the time-sensitive information. Additionally, a user might want to know every piece of time-sensitive information which was sent to a particular person. The present technology enables a summary to be created in a user readable format.

In one embodiment, a summary is provided of the time-sensitive information which was received by at least one person. For example, feedback is received as to whether or not time-sensitive information was successfully delivered to its intended targets. A summary of successful deliveries is provided via the present technology. It is appreciated that a summary of all of the unsuccessful attempts to deliver the time-sensitive information is also provided. As described herein regarding the summary provided of the time-sensitive information sent to at least one person, it is appreciated that a summary of time-sensitive information received may consist of a variation of information, depending upon the type of information desired.

Figure 4:
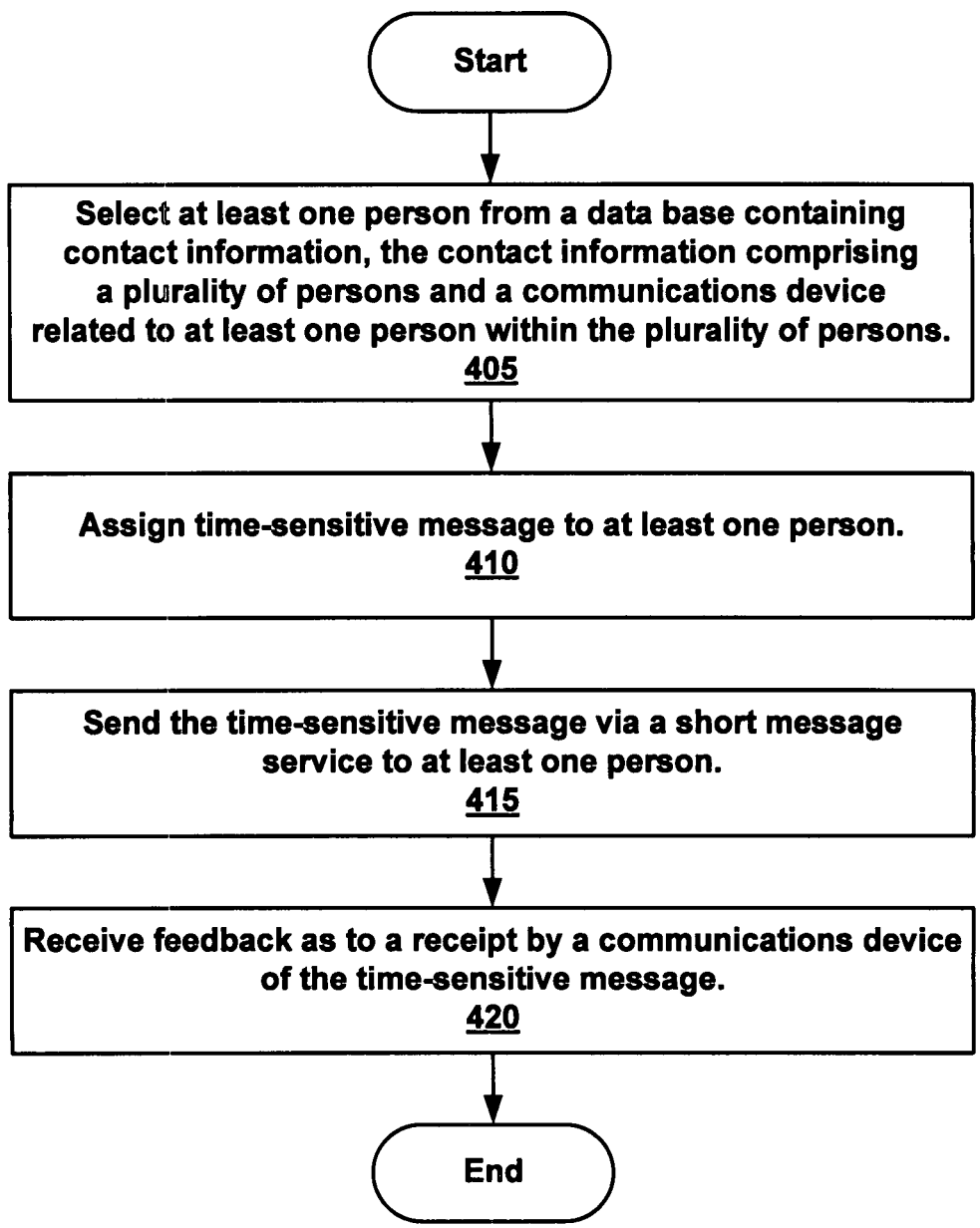
FIG. 4 is a flowchart of an example computer-usable medium storing instructions for informing at least one person of time-sensitive information via a short message service shown in accordance with embodiments of the present technology.

Referring now to 400 of FIG. 4, a flowchart of an example computer-usable medium storing instructions for informing at least one person of a time-sensitive message via a short message service is shown in accordance with an embodiment of the present technology.

Referring now to 405 of FIG. 4 and to FIGS. 1-3, at least one person is selected from data base of contact information 215, the contact information comprising a plurality of persons and a communications device related to at least one person within the plurality of persons. The explanation herein regarding accessing data base of contact information 215 related to at least one person in response to receiving a request to deliver the time-sensitive information via a short message service may be applied to an example computer-usable medium storing instructions for selecting from data base of contact information 215, the contact information comprising a plurality of persons and a communications device related to at least one person within the plurality of persons at least one person from a data base of people and will not be repeated for purposes of brevity and clarity.

Referring now to 410 of FIG. 4 and to FIGS. 1-3, a time sensitive message is assigned to at least one person. The 'message' comprises the time sensitive information described herein. The explanation herein regarding assigning the time-sensitive information to at least one person may be applied to an example computer-usable medium storing instructions for assigning a time-sensitive message to at least one person and will not be repeated for purposes of brevity and clarity.

Referring now to 415 of FIG. 4 and to FIGS. 1-3, a time-sensitive message is sent via a short message service to at least one person. The explanation herein regarding sending time-sensitive information to at least one person may be applied to an example computer-usable medium storing instructions for sending a time-sensitive message via a short message service to at least one person and will not be repeated for purposes of brevity and clarity.

Referring now to 420 of FIG. 4 and to FIGS. 1-3, feedback is received as to a receipt by a communications device of a time-sensitive message. A communications device may be any device that is capable of communicating with other devices. The explanation herein regarding receiving feedback that time-sensitive information was received by at least one person may be applied to an example computer-usable medium storing instructions for receiving feedback as to a receipt by a communications device of a time-sensitive message and will not be repeated for purposes of brevity and clarity.

By utilizing a short message service overlaid onto a program capable of accessing a network, the present technology enables the rapid and efficient dissemination of time-sensitive information to a selected group of people. Furthermore, the present technology enables a user to view differently formatted summaries regarding time-sensitive information which was sent and time-sensitive information which was successfully delivered. Additionally, the present technology enables an alternative method of delivering time-sensitive information to a target when a first attempt to deliver this information is shown to be unsuccessful. In short, the present technology enables a cost beneficial method of rapidly disseminating time-sensitive information so that targeted individuals may receive important information without experiencing problems such as downed phone lines, unanswered phone calls, and tardy delivery of messages.

Example Computer System Environment

Figure 5:
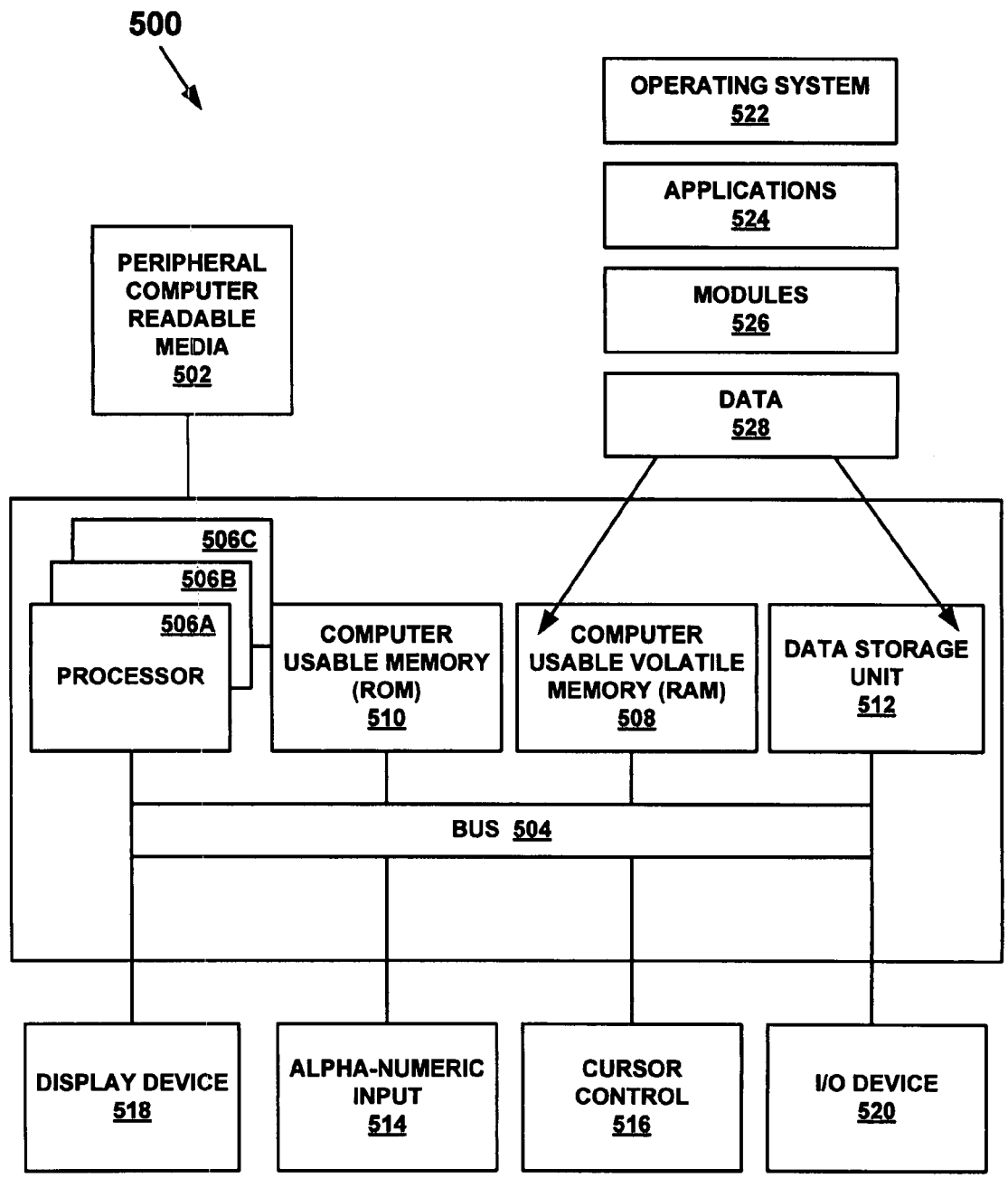
FIG. 5 is a diagram of an example computer system used in accordance with embodiments of the present technology.

With reference now to FIG. 5, portions of the present technology are composed of computer-readable and computer-executable instructions that reside, for example, in computer-usable media of a computer system. That is, FIG. 5 illustrates one example of a type of computer that can be used to implement embodiments, which are discussed below, of the present technology. FIG. 5 illustrates an example computer system 500 used in accordance with embodiments of the present technology. It is appreciated that system 500 of FIG. 5 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors.

System 500 also includes data storage features such as a computer usable volatile memory 508, e.g. random access memory (RAM), coupled to bus 504 for storing information and instructions for processors 506A, 506B, and 506C. System 500 also includes computer usable non-volatile memory 510, e.g. read only memory (ROM), coupled to bus 504 for storing static information and instructions for processors 506A, 506B, and 506C. Also present in system 500 is a data storage unit 512 (e.g., a magnetic or optical disk and disk drive) coupled to bus 504 for storing information and instructions.

System 500 also includes an optional alphanumeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 may be a liquid crystal device, cathode ray tube, plasma display device or other display device suitable for creating, presenting, or displaying graphic images and/or symbols or alphanumeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, directional and input keys on a multimedia remote control, or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands. System 500 is also well suited to having a cursor directed by other means such as, for example, voice commands.

System 500 also includes an I/O device 520 for coupling system 500 with external entities. For example, in one embodiment, I/O device 520 is a modem for enabling wired or wireless communications between system 500 and an external network such as, but not limited to, the Internet.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. In one embodiment, the present technology is stored, for example, as an application 524 or module 526 in memory locations within RAM 508, computer readable media within data storage unit 512, and/or peripheral computer readable media 502.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the exemplary computing system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for providing time-sensitive information to a plurality of people via a short message service, said method comprising:
    accessing a data base of contact information related to a plurality of people in response to receiving a request to deliver said time-sensitive information via said short message service, said time-sensitive information comprising information which is important based upon an involved factor of time, said time-sensitive information comprising a stand-alone, time-sensitive message that can be obtained without requiring any additional actions to be taken by any of said plurality of people receiving said time-sensitive information;
    assigning said time-sensitive information to said plurality of people;
    sending said time-sensitive information to said plurality of people;
    receiving feedback for each of said plurality of people that said time-sensitive information was received by each of said plurality of people; and
    sending said time-sensitive message at a pre-determined time.

2. The method as described in claim 1, further comprising:
    selecting a group of people from a data base of contacts to receive said time-sensitive information.

3. The method as described in claim 1, further comprising:
    utilizing an emergency as said time-sensitive information.

4. The method as described in claim 1, further comprising:
    utilizing a company event as said time-sensitive information.

5. The method as described in claim 1, further comprising:
    if at least one person of said plurality of people did not receive said time-sensitive information, sending a message to a pre-determined location associated with at least one third party, wherein said message includes instructions to deliver said time-sensitive information to said at least one person.

6. The method as described in claim 1, further comprising:
    providing a summary of said time-sensitive information sent to said plurality of people.

7. The method as described in claim 1, further comprising:
    providing a summary of said time-sensitive information received by said plurality of people.

8. A time-sensitive information informer associated with a short message service comprising:
    a data base accessor configured to access a data base of contact information related to a plurality of people;
    a time-sensitive information assignor configured to receive time-sensitive information and assign said time-sensitive information to said plurality of people, said time-sensitive information comprising information which is important based upon an involved factor of time, said time-sensitive information comprising a stand-alone, time-sensitive message that can be obtained without requiring any additional actions to be taken by any of said plurality of people receiving said time-sensitive information;
    a transmitter configured to utilize said contact information to transmit said time-sensitive information to said plurality of people;

a feedback receiver configured to receive feedback for each of said plurality of people as to whether or not each of said plurality of people received said time-sensitive information; and wherein said time-sensitive message is sent at a pre-determined time.

9. The time-sensitive information informer of claim 8, wherein said time-sensitive information is associated with an emergency.

10. The time-sensitive information informer of claim 8, wherein said time-sensitive information is associated with company business.

11. The time-sensitive information informer of claim 8, further comprising:

a data base accessor configured to access a data base containing contact information, said contact information comprising a plurality of persons and a plurality of communications devices related to a group of persons within said plurality of persons;

a time-sensitive information assignor for assigning received time-sensitive information to said group of persons;

a transmitter configured to utilize said contact information to transmit said time-sensitive information to said plurality of communications devices; and a feedback receiver configured to receive feedback as to whether or not said communications devices received said time-sensitive information.

12. The time-sensitive information informer of claim 11, further comprising:

a summarizer configured to provide a summary of said time-sensitive information transmitted to said plurality of communications devices and received by said plurality of communications devices.

13. An non-transitory computer-usable medium storing instructions of a computer-implemented method for informing at least one person of a time-sensitive information via a short message service, said computer-implemented method comprising:

selecting a subset of people from a data base containing contact information, said contact information comprising a plurality of persons and a communications device related to at least one person within said plurality of persons;

assigning said time-sensitive information to said subset of people, said time-sensitive information comprising information which is important based upon an involved factor of time, said time-sensitive information comprising a stand-alone, time-sensitive message that can be obtained without requiring any additional actions to be taken by any of said plurality of persons receiving said time-sensitive information;

sending said time-sensitive information via said short message service to said subset of people;

receiving feedback as to a receipt by said communications device of said time-sensitive information for each of said subset of people; and sending said time-sensitive message at a pre-determined time.

14. The computer-usable medium storing instructions as described in claim 13, wherein said computer-implemented method further comprises:

if said at least one person did not receive said time-sensitive message, sending an instruction to a pre-determined location associated with at least one third party, wherein said instruction directs a delivery of said time-sensitive message to said at least one person.

15. The computer-usable medium storing instructions as described in claim 13, wherein said computer-implemented method further comprises:

utilizing an emergency as said time-sensitive message.

16. The computer-usable medium storing instructions as described in claim 13, wherein said computer-implemented method further comprises:

utilizing company business as said time-sensitive message.

17. The computer-usable medium storing instructions as described in claim 13, wherein said computer-implemented method further comprises:

receiving a summary of messages sent to said at least one person and received by each of said at least one person.

* * * * *

UNITED STATES PATENT AND TRADEMARK OFFICE
CERTIFICATE OF CORRECTION

PATENT NO. : 8,423,056 B2  
APPLICATION NO. : 11/894330  
DATED : April 16, 2013  
INVENTOR(S) : Abrantes et al.

Page 1 of 1

It is certified that error appears in the above-identified patent and that said Letters Patent is hereby corrected as shown below:

On the Title Page, Item [75] Inventors: Delete: "Edgardo"

Insert -- Eduardo --

On the Title page, column 2, line 22-23, OTHER PUBLICATIONS: Delete: "SXS Xprez, "Application", mhtml:file://C:\Notes\PKTMP000.mht, Ontrack Systems Limited, 2006-2007., (2006), 1-9."

Insert -- SMS Xprez, "Application", mhtml:file://C:\Notes\PKTMP000.mht, Ontrack Systems Limited, 2006-2007., (2006), 1-9. --

Signed and Sealed this  
Tenth Day of September, 2013

Teresa Stanek Rea  
*Acting Director of the United States Patent and Trademark Office*